3,179,558
METHOD FOR CONTROLLING NEMATODES WITH GAMMA-PHENOXYBUTYRIC ACID
Earl P. Williams, Pen Argyl, Pa., and Raymond L. Mayhew, Summit, N.J., assignors to General Aniline & Film Corporation, New York, N.Y., a corporation of Delaware
No Drawing. Filed Dec. 11, 1962, Ser. No. 243,754
9 Claims. (Cl. 167—30)

The present invention relates to nematocidal compositions and more particularly relates to nematocidal compositions containing gamma-phenoxybutyric acid. The present invention also relates to processes for contacting soil nematodes with the nematocidal compositions of the invention.

A wide variety of compounds have been proposed heretofore for utilization in controlling nematodes. Of the compounds previously available only a small minority thereof have proven to be completely successful in terms of their activity for providing the desired degree of nematode control. In many instances, the compounds displaying the desired nematocidal characteristics have required relatively difficult and expensive procedures to be carried out in their preparation. Thus, many of the presently available nematocides are not suitably adapted for satisfying demands for nematocides in commercial quantities. Accordingly, the commercially prohibitive costs of many available nematocides have, in some instances, caused those employing bulk quantities of nematocides to resort to the utilization of compounds displaying less than the desired degree of nematocidal activity.

Accordingly, it is the primary object of the present invention to provide a nematocidal composition having exceptional activity for the control of nematodes.

It is another object of the present invention to provide a nematocidal composition having outstanding activity for controlling nematodes and which is readily and economically available.

It is a further object of the present invention to provide a nematocidal composition which is readily available in liquid or solid form and which comprises gamma-phenoxybutyric acid.

It is still another object of the present invention to provide a process for applying a nematocidal composition comprising gamma-phenoxybutyric acid to nematode infested areas for contacting soil nematodes therewith to provide an exceptionally efficient means for controlling and eradicating nematodes.

Broadly described, the present invention provides a nematocidal composition consisting essentially of gamma-phenoxybutyric acid and an inert liquid or solid carrier.

The present invention also provides a method for controlling soil nematodes which comprises contacting said nematodes with gamma-phenoxybutyric acid.

The active ingredient of the nematocidal composition of the present invention, gamma-phenoxybutyric acid, readily and easily can be prepared by several available processes. For example, gamma-phenoxybutyric acid economically can be produced by reacting phenol with butyrolactone, or by reacting phenol with gamma-chlorobutyric acid.

The carrier employed in the nematocidal compositions of the present invention may consist of any inert material or combination of inert materials conventionally employed in preparing nematocidal compositions including liquids and solids. Thus, suitable nematocidal compositions of the present invention may be prepared by dissolving and/or dispersing gamma-phenoxybutyric acid in normally liquid carriers including, without limitation, water, liquid ketones, such as acetone, methyl ethyl ketone, and cyclohexanone, selected liquid iso-paraffinic hydrocarbons such as those known commercially as Soltrols and Velsicols, liquid straight-chain hydrocarbons, naphthas, kerosenes, such as deodorized kerosene, and the like. Specific examples of solid carriers contemplated for use in preparing the compositions of the present invention include pumice, talc, clay and the like. The present invention also contemplates nematocidal compositions wherein gamma-phenoxybutyric acid is dispersed in a solid grease or wax-containing carrier.

The actual amount of gamma-phenoxybutyric acid present in a given composition of the present invention varies depending upon, inter alia, the nature of the particular carrier material, the nature and environmental conditions of the nematode-containing soil to which that particular composition is to be applied, and the technique contemplated for use in applying the composition to the soil.

When it is desired to apply the nematocide of the present invention to nematode-infested areas by a dusting technique, solid carriers such as those described above are employed in preparing the desired compositions. The amount of gamma-phenoxybutyric acid present in such solid compositions suitably may range up to about 50% by weight and higher of the composition. Due to the exceptional activity of gamma-phenoxybutyric acid in controlling nematodes, the acid usually is employed in amounts in the range of from about 1 to about 20% by weight of the composition. Generally, it is desired to select a carrier that will readily permeate nematode-containing soil and carry the toxic gamma-phenoxybutyric acid ingredient to the nematodes present therein. In such instances, solutions or dispersions of gamma-phenoxybutyric acid in liquid carriers are preferred for utilization wherein the amount of gamma-phenoxybutyric acid present is in the range of from about 0.001 to about 20%, preferably from about 1 to about 15%, by weight of the composition.

In those instances, wherein the solubility of gamma-phenoxybutyric acid in the solvent desired to be employed is not sufficient to provide a solution having the desired concentration, any suitable dispersing or emulsifying agent may be employed. For example, the solubility of gamma-phenoxybutyric acid in water is about 0.5 gm. per 100 ml. at 65° C. and in naphtha is about 2 gm. per 100 ml. at 30° C. Higher concentrations of gamma-phenoxybutyric acid than are possible by dissolving the acid in either water or a liquid hydrocarbon easily can be prepared by dispersing or emulsifying the desired additional amount of the acid therein using a surface active agent such as an Igepal, an alkylphenoxy-polyethyleneoxyethanol, e.g., octylphenoxy-polyethyleneoxyethanol. The liquid nematocidal composition of the invention may be applied to nematode-infested areas by any suitable technique such as by spraying and the like.

While it is stated above that the nematocidal composition of the invention may be applied to nematode-containing soils alone by dusting, spraying, and the like, it will be understood the present invention also contemplates the application of the nematocide to soils in formulations also containing other active materials such as fertilizers, insecticides, fungicides and the like. A particularly useful formulation can be prepared by combining the compositions of the present invention with fertilizers since gamma-phenoxybutyric acid is characterized by anti-fungicidal properties in addition to anti-nematode activity.

The invention having been broadly described above, the following examples are given to illustrate specific embodiments of the nematocidal compositions and processes for applying same of the present invention. It will be understood that the examples are given by way of illustration only, and are not intended to be limiting upon the scope of the invention:

EXAMPLE I

A. *Testing procedure*

A brei of tomato plants infested with root knot nematodes, *Meloidogyne incognito,* was prepared by cutting the roots of the infested plants into ¼ inch lengths and then macerating the lengths of the roots in a Waring Blendor for one minute. Duplicate 5 gm. samples of the brei were then mechanically mixed with 100 gm. samples of dry sand for one minute in a closed jar. The brei-sand admixtures were then transferred to 2¼ inch pots. The pots containing the admixtures were then wrapped in Saran and allowed to stand for 24 hours after which time the admixtures were transferred to stainless steel cylindrical screens being approximately 2¼ in. high and 3½ in. in diameter and consisting of 100 mesh wire cloth. The screens containing the admixtures were then placed in the bottom of a 9 cm. petri-dish containing 25 ml. of water and covered after an additional 10 ml. of water were added to each dish to insure that free water was available. After 24 hours, microscopic counts were made of living nematodes which had migrated through the screen and into the petri-dish. At least 10 fields were read per dish. After 48 hours the microscopic counts were repeated. The duplicate blank runs on the nematode-containing brei showed an average of 189 living nematodes in 10 fields.

B. *Gamma-phenoxybutyric acid*

Duplicate runs were conducted according to the above procedure with the exception that 15 mg. of gamma-phenoxybutyric acid were added to the sand-brei admixture in the pots before wrapping them in the Saran. The microscopic counts on the gamma-phenoxybutyric acid samples showed an average of 2 living nematodes in 10 fields. Accordingly, the tests revealed the exceptional activity of gamma-phenoxybutyric acid in controlling and eradicating nematodes.

EXAMPLE II

In order to compare the activity of gamma-phenoxybutyric acid as a nematocide with that of similar compounds the test procedure of Example I was repeated with the exceptions of substituting for gamma-phenoxybutyric acid each of the following: gamma-(β-naphthoxy)butyric acid, phenylbutyric acid, p-chlorophenylbutyric acid, p-nonylphenoxybutyric acid, and 2,4-dichlorophenoxybutyric acid. The results of the tests made with these compounds are set out below in Table 1. For purposes of comparison, the results of the blank run and the run employing gamma-phenoxybutyric acid are also shown in the table.

TABLE 1

| Compound: | Living nemas in 10 fields |
|---|---|
| Gamma-phenoxybutyric acid | 2 |
| Gamma-(β-naphthoxy)butyric acid | 24 |
| Phenylbutyric acid | 15 |
| p-Chlorophenylbutyric acid | 15 |
| p-Nonylphenoxybutyric acid | 183 |
| 2,4-dichlorophenoxybutyric acid | 184 |
| Blank | 189 |

It can be seen from the above table that gamma-phenoxybutyric acid has outstanding characteristics as a nematocide, while the closely related compounds display little or no marked anti-nematocide activity and are relatively ineffective as compared to gamma-phenoxybutyric acid.

Modification of the compositions and processes of the present invention which do not depart from the scope of the present invention will be apparent to one skilled in the art from the description and embodiments given above of the present invention, and it is intended that the invention be limited only by the scope of the appended claims.

What is claimed is:

1. A method for controlling soil nematodes which comprises contacting said nematodes with gamma-phenoxybutyric acid.

2. The method for controlling soil nematodes according to claim 1 wherein said gamma-phenoxybutyric acid is supplied to said soil nematodes in the form of a composition consisting essentially of gamma-phenoxybutyric acid and a carrier therefor.

3. The method for controlling soil nematodes according to claim 2 wherein said carrier is a liquid.

4. The method for controlling soil nematodes according to claim 3 wherein said liquid carrier is selected from the group consisting of water, liquid ketones, liquid isoparaffinic hydrocarbons, liquid straight chain hydrocarbons, naphthas, and kerosenes.

5. The method for controlling soil nematodes according to claim 3 wherein the amount of said gamma-phenoxybutyric acid present is in the range of from about 0.001 to about 20% by weight of said composition.

6. The method for controlling soil nematodes according to claim 2 wherein said carrier is a solid.

7. The method for controlling soil nematodes according to claim 6 wherein said solid is selected from the group consisting of pumice, talc, clay, and mixtures thereof.

8. The method for controlling said nematodes according to claim 6 wherein the amount of said gamma-phenoxybutyric acid present is in the range of from about 1 to about 50% by weight of said composition.

9. The method for controlling soil nematodes according to claim 2 wherein said carrier includes a fertilizer.

References Cited in the file of this patent

UNITED STATES PATENTS

| 2,558,762 | Kohr et al. | July 3, 1951 |
| 2,852,426 | Stansbury | Sept. 16, 1958 |
| 3,080,280 | Lindner | Mar. 5, 1963 |

OTHER REFERENCES

Chem. Abst., vol. 54 (1959), p. 19558a.
Chem. Abst., vol. 53 (1958), p. 227d.